United States Patent
Hardy et al.

(10) Patent No.: US 7,420,004 B2
(45) Date of Patent: Sep. 2, 2008

(54) PROCESS AND SYSTEM FOR PRODUCING SYNTHETIC LIQUID HYDROCARBON FUELS

(75) Inventors: Dennis R. Hardy, Alexandria, VA (US); Timothy Coffey, McLean, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 52 days.

(21) Appl. No.: 11/108,149

(22) Filed: Apr. 12, 2005

(65) Prior Publication Data

US 2005/0232833 A1 Oct. 20, 2005

Related U.S. Application Data

(60) Provisional application No. 60/562,410, filed on Apr. 15, 2004.

(51) Int. Cl.
  *C07C 27/00* (2006.01)
  *B01J 8/00* (2006.01)
(52) U.S. Cl. ............... 518/704; 48/127.3; 48/127.7; 48/128; 422/189; 422/190; 518/700; 518/706
(58) Field of Classification Search ............. 422/190, 422/189; 48/128, 127.7, 127.3; 518/706, 518/700, 704
See application file for complete search history.

(56) References Cited

U.S. PATENT DOCUMENTS

| | | | | |
|---|---|---|---|---|
| 2,564,236 | A | * | 8/1951 | Sowden, Jr. ............ 48/197 R |
| 3,617,554 | A | * | 11/1971 | Thorborg ................. 210/664 |
| 3,723,344 | A | * | 3/1973 | Reynolds ................. 252/373 |
| 4,282,187 | A | * | 8/1981 | Corbett et al. ............ 422/190 |
| 4,520,216 | A | * | 5/1985 | Skov et al. ............... 585/315 |
| 4,568,522 | A | | 2/1986 | Corbett |
| 4,776,171 | A | * | 10/1988 | Perry et al. ............... 60/698 |
| 5,336,825 | A | * | 8/1994 | Choudhary et al. ....... 585/500 |
| 6,007,742 | A | * | 12/1999 | Czernichowski et al. ... 252/372 |
| 6,596,781 | B1 | * | 7/2003 | Schinski .................. 518/700 |
| 6,703,429 | B2 | * | 3/2004 | O'Rear et al. ............. 518/706 |
| 2004/0029983 | A1 | | 2/2004 | Yakobson |
| 2005/0193626 | A1 | * | 9/2005 | Takayama et al. .......... 48/128 |
| 2006/0063845 | A1 | * | 3/2006 | O'Rear et al. ............. 518/705 |

FOREIGN PATENT DOCUMENTS

| | | | |
|---|---|---|---|
| GB | 2168718 | * | 6/1986 |
| WO | WO 02/096838 | | 12/2002 |

OTHER PUBLICATIONS http://sbir.nasa.gov/SBIR/successes/ss/9-070text.html "Promotion of th Reverse Water-Gas Shift Reaction with Nanoscale Bimetallic Catalyst" Eltron Research, Inc. Jan. 21, 2005.*
http://spot.colorado.edu/meyertr/rwgs/rwgs.html, "The Reverse Water Gas shift", Thomas Meyer. posted Jan. 18, 2001.*
Bogart, "Production of Liquid Hydrocarbons from High Temperature Fission Reactors for Department of Defense and Commercial Applications" produced by EASI for General Atomics (2004).
Coffey et al., "Hydrogen as a Fuel for DOD" *Defense Horizons*, 36 (Nov. 2003).
Davis, "Fischer-Tropsch Synthesis The CAER Perspective" CAER, 8(3), 1-3 (1997).
Park et al., "Catalytic Reduction of Carbon Dioxide" *Energy Convers. Mgmt.*, 36(6-9), 573-576 (1995).
Rofer-Depoorter et al., "Untangling the Water Gas Shift From Fischer-Tropsch: A Gordian Knot?" Geochemistry Group, Los Alamos National Laboratory, P.O. Box 1663, MS D462, Los Alamos, NM 87545 (1983).
Specht et al., "Comparison of $CO_2$ sources for the synthesis of renewable methanol" *Advances in Chemical Conversion for Mitigating Carbon Dioxide*, 114, 363-367 (1998).
Terry, Synthetic Fuels for Naval Applications Produced Using Shipboard Nuclear Power (MIT Masters Thesis, 1995) (See pp. 71-72).

* cited by examiner

*Primary Examiner*—N. Bhat
(74) *Attorney, Agent, or Firm*—John J. Karasek; Joseph T. Grunkemeyer

(57) ABSTRACT

A process for producing synthetic hydrocarbons that reacts carbon dioxide, obtained from seawater of air, and hydrogen obtained from water, with a catalyst in a chemical process such as reverse water gas shift combined with Fischer Tropsch synthesis. The hydrogen is produced by nuclear reactor electricity, nuclear waste heat conversion, ocean thermal energy conversion, or any other source that is fossil fuel-free, such as wind or wave energy. The process can be either land based or sea based.

18 Claims, No Drawings

PROCESS AND SYSTEM FOR PRODUCING SYNTHETIC LIQUID HYDROCARBON FUELS

This application claims the benefit of U.S. Provisional Patent Application No. 60/562,410, filed on Apr. 15, 2004.

BACKGROUND OF THE INVENTION

1. Field of the Invention

The present invention relates to hydrocarbon production and, more specifically, to a process to make synthetic liquid hydrocarbons from carbon dioxide, obtained from seawater or air, and hydrogen from water without the use of fossil fuels in any step of the process. Description of the Related Art

2. Description of Prior Art

The United States Navy uses over a billion gallons of liquid hydrocarbon fuel each year. The fuel is procured from petroleum refineries and suppliers around the world and is transported to its final location of use. This can involve fuel shipments over thousands of miles and many weeks of transport. Moreover, implementing fuel cells on ships requires a hydrogen carrier such as liquid hydrocarbon fuels that are extremely low in sulfur content since this contaminant will poison the fuel cell fuel reformer.

Although the idea for developing synthetic liquid hydrocarbon fuels has been discussed for at least the last 30 years, there has not been an apparent need to produce them because of the availability, ease of processing, and high-energy conversion efficiency of fossil fuels. However, the fossil fuel market is changing. One reason for this change is the ongoing political instability in oil producing regions. Another reason is the increasing worldwide energy demand.

There are several disadvantages to using fossil fuels. First, fossil fuels are a limited resource that cannot be regenerated. Additionally, hydrocarbon fuels made from fossil fuels may contain highly undesirable sulfur, nitrogen, and aromatic compounds. When these fuels are burned, sulfur, nitrogen, and particulates are released into the air, which leads to the formation of acid rain and smog.

There are several well-established processes for direct hydrogenation of gases such as CO or $CO_2$ to produce hydrocarbon fuels. One of the most successful was developed in Germany in the 1920s by Franz Fischer and Hans Tropsch. In 1938, early German plants produced 591,000 metric tons per year, approximately $5 \times 10^6$ barrels per year or approximately $2 \times 10^8$ gallons/year, of oil and gasoline using the Fischer-Tropsch process, which reacts carbon monoxide and hydrogen with a catalyst to produce liquid hydrocarbons and water. The problem with these methods is that they use fossil fuels to produce the CO, $CO_2$, and $H_2$ used.

Additionally, well-known methods have been developed to produce methanol from carbon dioxide and hydrogen. One successful process is the Lurgi process. Methanol can also be used as a feedstock to produce traditional automotive gasoline. The problem with these methods is that the flash point of methanol is 11° C. and the flash point of gasoline is well below 0° C. Therefore, these methods cannot be used at sea, since the International Maritime Organization and the U.S. Navy require a minimum 60° C. flash point for all bulk flammable liquids on ships.

SUMMARY

The aforementioned problems are overcome by the present invention wherein the desired synthetic hydrocarbons are produced by reacting carbon dioxide, obtained from seawater or air, and hydrogen from water with a catalyst in a chemical process such as reverse water gas shift combined with Fischer Tropsch synthesis. The reverse water gas shift ($CO_2 + H_2 \rightarrow CO + H_2O$) produces carbon monoxide, which is reacted with hydrogen in the Fischer Tropsch synthesis to produce synthetic liquid hydrocarbons and water. Alternatively, a Lurgi process can be used for intermediate method production, which can be used in the Fischer Tropsch synthesis. The present invention can be either land based of sea based.

In a preferred embodiment, carbon dioxide is recovered by partial vacuum degassing during the pumping of seawater from any depth, extraction from seawater by any other physical or chemical process, absorption from air by any known physical or chemical means, or any combination of the above methods.

Hydrogen is produced by standard electrolysis of water using electrodes, thermolysis of water (for example using waste heat from nuclear reactors), thermochemical processes, and any combination of the above methods. Energy for the hydrogen production can be provided by nuclear reactor electricity; nuclear reactor waste heat conversion; a thermochemical process; ocean thermal energy conversion to electricity; any other source of fossil fuel free electricity such as ocean waves, wind, tides or currents; or any combination of the above methods.

The catalyst for the Fischer Tropsch reaction can be a metal such as iron, cobalt, nickel, and combinations thereof; a metal oxide such as iron oxide, cobalt oxide, nickel oxide, ruthenium oxide, and combinations thereof; support type material such as alumina or zeolites; supported metals, mixed metals, metal oxides, mixed metal oxides; and any combination of the above.

Unique benefits of liquid hydrocarbons produced according to this invention include: they have no sulfur content, they have no nitrogen content, they have no aromatics content, they have high volumetric and gravimetric energy density, they have an excellent resistance to thermal oxidation processes, they are fire safe (i.e., they are hard to ignite), they have good low temperature properties, they can be reformed easily for production of hydrogen in fuel cell applications, they are produced without using fossil fuels, the process is carbon neutral when combusted, the starting materials are cost free, and in situ production of stored energy requires no large storage volumes or long distance transport for naval uses. Additionally, an equal volume of fresh water is produced as a useful byproduct.

DETAILED DESCRIPTION OF THE INVENTION

In a preferred embodiment of the present invention, carbon dioxide and hydrogen are used to produce synthetic liquid hydrocarbons. Using the reverse water gas shift, carbon dioxide is reduced by hydrogen to carbon monoxide and water. See, for example, Cheryl K. Rofer-DePoorter, "Untangling the Water Gas Shift from Fischer-Tropsch: A Gordian Knot?" the Geochemistry Group, Los Alamos National Laboratory, P.O. Box 1663, MS D462, Los Alamos, N. Mex. 87545 (1983), the entire contents of which are incorporated herein by reference. The water is recovered and the carbon monoxide is fed along with additional hydrogen to a Fischer Tropsch based (catalyzed) reactor that produces equal volumes of fresh water and liquid hydrocarbon as the final products of value. The resulting liquid hydrocarbons of the desired molecular weight and shape are free of sulfur, nitrogen, and aromatics, so they can be further processed to make a cyclic unsaturated material that could be supplied to all current types of engines, such as compression ignition, internal combustion, and gas turbine based engines. Alternatively, carbon dioxide and hydrogen may be catalyzed to form methanol and water. The materials are recovered and the methanol is immediately fed to a Fischer Tropsch based reactor along with additional hydrogen to form the desired synthetic liquid hydrocarbons.

The source of carbon is dissolved carbon dioxide in the ocean or the air. The recovery of carbon dioxide from seawater may be by degassing of subsurface water or by some other means of recovery from water such as membranes. There are many known procedures for physically or chemically removing carbon dioxide from seawater or air that may be used, such as by extraction or absorption. See, for example, S. Locke Bogart, "White Paper on Production of Liquid Hydrocarbons from High Temperature Fission Reactors for Department of Defense and Commercial Applications," produced by EASI for General Atomics, Jan. 31, 2004; and G. Gran, "Determination of the equivalence point in potentiometric titrations,", The Analyst, 22, 661-671, 1952, the entire contents of both are incorporated herein by reference.

The degassing apparatus consists of any water pump fitted with a chamber for collecting the gasses collected from seawater by partial vacuum. The carbon dioxide collected in the chamber can be continually fed into the chemical reactors to just sustain the production of the liquid hydrocarbon products at the desired rate.

The source of hydrogen can be from ocean thermal energy conversion (OTEC). OTEC generates electricity, which can be used to electrolyze water to produce hydrogen. The use of OTEC is restricted to the tropical oceans where there is a greater than 18° C. temperature gradient between surface and subsurface waters. Alternatively, nuclear power plants can be used as a source of electricity, nuclear reactor waste heat can be used to produce hydrogen, or thermochemical processes can also be used. OTEC, nuclear reactor electricity, nuclear waste heat conversion, and thermochemical processes can also be used to provide the energy required for degassing.

The electricity needed to produce the hydrogen comes from nuclear reactors, OTEC generators, any other fossil fuel free source such as wind, wave, tidal or ocean current sources, or any combination of the above sources. While fossil fuels may be used as energy sources for this process, their use will lower the net energy obtained from the production of hydrocarbons by this invention. The standard water/steam generators from nuclear reactors are well known. The low temperature generator cycles from OTEC are also well known. An added benefit of using OTEC as part of the entire coupled process of producing liquid hydrocarbons is that pumping large volumes of water is integral to the process of generating electricity and the same pumped water can serve as the source of carbon dioxide.

Commercial electrolyzers are available to electrolyze water for the production of hydrogen needed as a reactant in the production of the hydrocarbons. Alternatively, known methods such as thermolysis, i.e., heat assisted electrolysis, are available, if sufficient heat from nuclear reactors is available. Finally, known thermochemical processes are also available for hydrogen production using even less energy.

The chemical reactions are carried out using the gas phase reactants, i.e., carbon dioxide and hydrogen, obtained from the air, water, or both, at rates necessary to sustain the reactions and produce required amounts of liquid hydrocarbon product. A preferred embodiment involves standard, well known fixed bed or slurry type flow reactor systems through catalyst beds at established temperatures, pressures, and flow rates. A preferred embodiment for a shipboard application includes the joining of reactors for a catalytic methanol production with immediate reaction of the methanol plus hydrogen to form liquid hydrocarbons for shipboard use.

The Fischer Tropsch synthesis reacts gaseous sources of carbon less oxidized than $CO_2$, i.e., such as carbon monoxide or methanol, and hydrogen with a catalyst to obtain water and liquid hydrocarbons, see, for example, A. Hoff, "CO Hydrogenation Over Cobalt Fischer-Tropsch Catalysts," Norges Tekniske Hoegskole (1993); A. O. I. Rautavouma, "The Hydrogenation of Carbon Monoxide on Cobalt Catalysts," Technische Hogeschool Eindhoven (1979); and Cheryl K. Rofer-DePoorter, "Untangling the Water Gas Shift from Fischer-Tropsch: A Gordian Knot?" the Geochemistry Group, Los Alamos National Laboratory, 1983; P.O. Box 1663, MS D462, Los Alamos, N. Mex. 87545 (1983); all of which are incorporated herein by reference in their entirety:

$$CO+H_2 \rightarrow R-(CH_2)_nR+H_2O \text{ or } CH_3OH+H_2 \rightarrow R-(CH_2)_n-R+H_2O$$

where R is branched methylene or a terminal methyl group.

Typical conditions for this reaction on iron, cobalt, or mixed metal catalyst beds are as follows: for example, for iron or cobalt the temperature range is 178° C. to 320° C. and the pressure range is 1-10 MPa. The reaction is very exothermic and produces waste heat that can be used to produce electricity with a theoretical maximum of about 10 kW/1000 gallons.

Two different reactions can be used to obtain the reactants for the Fischer Tropsch reaction: the well known reverse water gas shift and the well-known Lurgi process, also known as the Carnol process. In the reverse water gas shift reaction, carbon dioxide is reacted with hydrogen to produce carbon monoxide and water:

$$CO_2+H_2 \rightarrow CO+H_2O$$

Typical conditions for reverse water gas shift reactions are temperatures between 200 and 400° C. near atmospheric pressure in the presence of catalysts such as iron. See, for example, Pradyot Patnaik, "Handbook of Inorganic Chemicals," published by McGraw-Hill, 2003, the entire contents of which are incorporated herein by reference. The carbon monoxide produced from this reaction is then used in the Fischer Tropsch synthesis to obtain liquid hydrocarbons.

The Carnol or Lurgi process uses the same reactants as the reverse water gas shift reaction with different catalysts and reaction conditions to produce methanol, see, for example, Y. Miyamoto et al., "Methanol Synthesis from Recycled Carbon Dioxide and Hydrogen from High Temperature Steam Electrolysis with the Nuclear Heat of an HTGR," IAEA-TECH-DOC—761, pp 79-85; Jamil Toyir et al., "Methanol Synthesis from CO2 and H2 over Gallium Promoted Copper-based Supported Catalysts. Effect of Hydrocarbon Impurities in the CO2/H2 Source," Phys. Chem. Chem. Phys., 3, 4837-4842 (2001); M. Lachowska and J. Skrezypek, "Hydrogenation of carbon dioxide to methanol over Mn promoted copper/zinc/zirconia-catalysts," Proceedings of the 30th International Conference of the SSCHE, May 26-30, 2003; and Hermann Goehna and Peter Koenig, "Producing Methanol from CO2," CHEMTECH, June 1994):

$$CO_2+3H_2 \rightarrow CH_3OH+H_2O$$

An example of reactor conditions is as follows: Cu/CuO or Cu/ZnO as the catalyst, a temperature of between 200 and 300° C., a pressure in the range of 40-100 bar, and a flow of 8120 L/hr. The methanol produced from this reaction is then used in the Fischer Tropsch synthesis to obtain liquid hydrocarbons.

The reverse water gas reaction may be accomplished with or without the use of catalysts. The Fischer Tropsch synthesis is accomplished using a catalyst, as is the Carnol or Lurgi process. Catalysts that may be used for Fischer Tropsch synthesis and the reverse water gas reaction, if desired, include metals such as iron, cobalt, nickel; a combination of metals; metal oxides such as iron oxide, cobalt oxide, nickel oxide, and ruthenium oxide; a combination of metal oxides; support type materials such as alumina and zeolites; supported metals, mixed metals, metal oxides, or mixed metal oxides; and any combination of the above. See, for example, A. Hoff, "CO Hydrogenation Over Cobalt Fischer-Tropsch Catalysts," Norges Tekniske Hoegskole (1993); and Cheryl K. Rofer-DePoorter, "Untangling the Water Gas Shift from Fischer-Tropsch: A Gordian Knot?" the Geochemistry Group, Los Alamos National Laboratory; P.O. Box 1663, MS D462, Los Alamos, N. Mex. 87545 (1983), both of which are incorporated herein by reference in their entirety. Examples of typical catalysts for the Carnol or Lurgi process included supported Cu—Mn oxide and supported Cu—Zn oxide. See, for example, M. Specht, A. Bandi, M. Elser, and F. Staiss, "Comparison of CO2 sources for the synthesis of renewable methanol," Advances in Chemical Conversion for Mitigating Carbon Dioxide Studies in Surface Science and Catalysis, Vol. 114, T. Inui, M. Anpo, K. Izui, S. Yanagida, T. Yamaguchi (Eds.) 363-367 (1998), the entire contents of which is incorporated herein by reference.

The present invention can be either land based or ship based. For a land-based process using OTEC, an island near the equator (for example the Cayman Islands, the Philippines, or Guam) can be used to extend a pipe down into the water. For a ship-based process, energy can be obtained by OTEC or from the ship's nuclear reactor.

In a preferred embodiment, the limiting reagent or factor typically will be electricity produced from fossil fuel free sources. In a land-based embodiment, this electricity will only be limited by the size of the land based power availability; the size of the land based OTEC plant; or the size of the wind, wave, tidal or ocean current facility. In an ocean based embodiment, the electricity available will be limited to a fraction of the largest nuclear power plants installed on naval ships or to a maximum of about 200 megawatts from an OTEC ship.

This limiting factor, i.e., electricity, will determine the maximum amount of hydrogen that can be generated and the maximum rate at which hydrogen can be generated, after other electrical operating needs have been met. The hydrogen generation rate and daily production will in turn define the required daily production and rate of carbon dioxide recovery from ocean water, air, or both.

The maximum carbon dioxide recovery from water would be about 0.1 grams per liter, and the maximum recovery from air would be about 0.00047 grams per liter. The actual recovery rate and daily recovery will depend greatly on which of the many chemical, physical or combined type processes is selected for recovery, as they vary greatly in their recovery efficiencies. The most limited case for carbon dioxide recovery would be an ocean based embodiment.

Given the potential limiting factors for the most limiting case of embodiments available, both reactant generation rates must be adjusted so that they are consumed as they are produced during the final step of synthetic liquid hydrocarbon production in typical well known catalytic processes based on the Fischer Tropsch synthetic process.

The preferred embodiment will produce synthetic liquid hydrocarbons at a rate and daily production that is dependent upon the limitations described above. A typical production of about 100,000 gallons per day (about 4,000 gallons per hour) of approximately an average molecular weight of 150 daltons is possible for ocean-based embodiments with fossil fuel free electricity of about 100 mega watts. A land-based embodiment would typically be a multiple of this.

The above description is that of a preferred embodiment of the invention. Various modifications and variations are possible in light of the above teachings. It is therefore to be understood that, within the scope of the appended claims, the invention may be practiced otherwise than as specifically described. Any reference to claim elements in the singular, e.g. using the articles "a," "an," "the," or "said" is not construed as limiting the element to the singular.

What is claimed is:

1. A system for producing synthetic hydrocarbons, comprising:
    (a) a unit for recovering carbon dioxide from seawater, air, or a combination thereof;
    (b) a unit for producing hydrogen from water; and
    (c) a Fischer Tropsch synthesis unit wherein a process of reacting the carbon dioxide with the hydrogen to produce for intermediary methanol production is combined with Fischer Tropsch synthesis to produce said hydrocarbons from said carbon dioxide and said hydrogen.

2. The system of claim 1, wherein said carbon dioxide recovery unit is selected from the group consisting of:
    (a) a partial vacuum degassing process used during the pumping of seawater from any depth;
    (b) an extraction process for recovering carbon dioxide from seawater;
    (c) an absorption process for recovering carbon dioxide from air; and
    (d) any other process for recovering carbon dioxide from air or water; or
    (e) any combination thereof.

3. The system of claim 1, wherein said hydrogen production unit is selected from the group consisting of:
    (a) an electrolysis process;
    (b) a thermolysis process;
    (c) a thermochemical process; and
    (d) any combination thereof.

4. The system of claim 1, wherein the energy required for said hydrogen production unit is provided by nuclear reactor electricity; nuclear reactor waste heat conversion; ocean thermal energy conversion; any other non fossil fuel source such as waves, tide, wind, or ocean current energy; or combinations thereof.

5. The system of claim 1, wherein said Fischer Tropsch synthesis unit uses a catalyst selected from the group consisting of:
    (a) metals selected from the group consisting of iron, cobalt, and nickel, and combinations thereof;
    (b) metal oxides selected from the group consisting of iron oxide, cobalt oxide, nickel oxide, ruthenium oxide, and combinations thereof;
    (c) support type material selected from the group consisting of as alumina or zeolites;
    (d) supported metals, metal oxides, mixed metals, or mixed metal oxides; and
    (e) any combination thereof.

6. The system of claim 1, wherein said system is located on a structure at sea.

7. The system of claim 1, wherein the unit for recovering carbon dioxide recovers carbon dioxide from seawater.

8. The system of claim 1, wherein the unit for recovering carbon dioxide recovers carbon dioxide from seawater by a partial vacuum degassing process used during the pumping of seawater from any depth.

9. The system of claim 1, wherein the hydrocarbons are liquid hydrocarbons.

10. A process for producing synthetic hydrocarbons, comprising:
 (a) recovering carbon dioxide from seawater, air, or a combination thereof;
 (b) producing hydrogen from water; and
 (c) reacting said carbon dioxide and said hydrogen with a catalyst in a chemical process using:
  (1) a process of reacting the carbon dioxide with the hydrogen to produce for intermediary methanol production; and
  (2) a Fischer Tropsch synthesis to produce said hydrocarbons from said hydrogen and said intermediary carbon monoxide or methanol.

11. The process of claim 10, wherein said carbon dioxide recovery is selected from the group consisting of:
 (a) partial vacuum degassing during the pumping of seawater from any depth;
 (b) extraction from seawater by any physical or chemical means;
 (c) absorption from air by any known physical or chemical means; and
 (d) any combination thereof.

12. The process of claim 10, wherein said hydrogen production is selected from the group consisting of:
 (a) standard electrolysis of water;
 (b) thermolysis of water;
 (c) thermochemical processes; and
 (d) any combination thereof.

13. The process of claim 10, wherein the energy required for said hydrogen production is provided by nuclear reactor electricity; nuclear reactor waste heat conversion; ocean thermal energy conversion; any other non fossil fuel source such as waves, tide, wind, or ocean current energy; or combinations thereof.

14. The process of claim 10, wherein said catalyst is selected from the group consisting of:
 (a) metals selected from the group consisting of iron, cobalt, and nickel, and combinations thereof;
 (b) metal oxides selected from the group consisting of iron oxide, cobalt oxide, nickel oxide, ruthenium oxide, and combinations thereof;
 (c) support type material selected from the group consisting of alumina or zeolites;
 (d) supported metals, metal oxides, mixed metals, or mixed metal oxides; and
 (e) any combination thereof.

15. The process of claim 10, wherein said process is carried out on a structure at sea.

16. The process of claim 10, wherein the carbon dioxide is recovered from seawater.

17. The process of claim 10, wherein the carbon dioxide is recovered from seawater by a partial vacuum degassing process used during the pumping of seawater from any depth.

18. The process of claim 10, wherein the hydrocarbons are liquid hydrocarbons.

* * * * *